(12) United States Patent
Kataoka et al.

(10) Patent No.: US 7,835,816 B2
(45) Date of Patent: Nov. 16, 2010

(54) HEAT PROCESSING APPARATUS, HEAT PROCESSING METHOD, COMPUTER PROGRAM AND STORAGE MEDIUM

(75) Inventors: Yuki Kataoka, Sapporo (JP); Tojo Yukio, Nirasaki (JP)

(73) Assignee: Tokyo Electron Limited, Tokyo-To (JP)

( * ) Notice: Subject to any disclaimer, the term of this patent is extended or adjusted under 35 U.S.C. 154(b) by 626 days.

(21) Appl. No.: 11/889,581

(22) Filed: Aug. 14, 2007

(65) Prior Publication Data

US 2008/0046111 A1 Feb. 21, 2008

(30) Foreign Application Priority Data

Aug. 15, 2006 (JP) ............................. 2006-221665

(51) Int. Cl.
*G06F 19/00* (2006.01)

(52) U.S. Cl. ...................... 700/207; 700/300

(58) Field of Classification Search ................. 700/121, 700/207; 438/795, 689; 219/497; 118/725
See application file for complete search history.

(56) References Cited

U.S. PATENT DOCUMENTS

| | | | | |
|---|---|---|---|---|
| 4,957,588 A * | 9/1990 | Koshiba et al. | ................ | 216/63 |
| 5,380,485 A * | 1/1995 | Takahashi et al. | ............. | 422/62 |
| 6,402,844 B1 * | 6/2002 | Harada et al. | ................ | 118/666 |
| 6,946,167 B2 * | 9/2005 | Hosoi et al. | ................. | 427/569 |
| 7,135,659 B2 * | 11/2006 | Ejima | .......................... | 219/497 |
| 7,217,670 B2 * | 5/2007 | van Kesteren | ............... | 438/795 |
| 2004/0087185 A1 * | 5/2004 | Ejima | .......................... | 438/795 |
| 2007/0074660 A1 | 4/2007 | Park et al. | | |

FOREIGN PATENT DOCUMENTS

JP 2005-159317 6/2005

\* cited by examiner

*Primary Examiner*—Kidest Bahta
(74) *Attorney, Agent, or Firm*—Smith, Cambrell & Russell, LLP

(57) ABSTRACT

In a vertical-type heat processing apparatus, it is intended to stabilize the temperature of an inner wall of the reaction vessel upon loading as well as to reduce particle contamination, for example, by suppressing peeling of films attached to the inner wall. An inner wall temperature sensor is attached, in advance, to the inner wall of the reaction vessel, so as to obtain each time series data of detection values of the inner wall temperature sensor and a command value of power to be supplied to heating means. The inner wall temperature is predicted from the command value of the power obtained just before, based on the data, during an initial time of loading, so as to use the predicted value of the inner wall temperature as an object to be controlled. Thereafter, around the end time of loading, the object to be controlled is gradually changed into a temperature detection value of a temperature detecting section provided outside the reaction vessel, so as to be completely changed over time into the temperature detection value.

21 Claims, 7 Drawing Sheets

HEAT PROCESSING APPARATUS, HEAT PROCESSING METHOD, COMPUTER PROGRAM AND STORAGE MEDIUM

CROSS REFERENCE TO RELATED APPLICATIONS

This application is based upon the prior Japanese Patent Application No. 2006-221665 filed on Aug. 15, 2006, the entire contents of which are incorporated herein by reference.

BACKGROUND OF THE INVENTION

1. Field of the Invention

The present invention relates to a technical field of temperature control for a heat processing apparatus, for example, a vertical-type heat processing apparatus, for carrying out a heat process, after placing a plurality of substrates, such as semiconductor wafers, on a substrate holding tool and carrying it into a reaction vessel.

2. Background Art

There is known a vertical-type heat processing apparatus to be used for providing a heat process, such as film forming due to CVD, oxidation, diffusion and the like, to semiconductor wafers (hereinafter, referred to as "wafers") in a batch manner. This vertical-type heat processing apparatus includes a heating furnace and a vertical-type reaction vessel provided in the heating furnace. A bottom end opening of the reaction vessel is opened and closed by a cover. A wafer boat, which is the substrate holding tool, is mounted on the cover, and multiple wafers are held in the wafer boat in a shelf-like state. Thereafter, the wafer boat is carried in the reaction vessel by raising the cover, followed by performing a predetermined heating process.

FIG. 8 shows a conventional vertical-type heat processing apparatus, which includes a reaction vessel 102, having a double tube structure composed of an inner tube 100 and an outer tube 101, and a heater 103. A processing gas is supplied through the inner tube 100 from below, and is discharged through a space provided between the inner tube 100 and the outer tube 101, flowing downward. Reference numeral 104 designates a wafer boat, 105 is a cover, and W expresses a wafer or wafers. As a temperature control method in such an apparatus, there are methods as shown in FIGS. 8(a) and 8(b). For convenience of illustration, the interior of the reaction vessel 102 is shown to be heated by a single heater 103. In fact, however, the heater 103 comprises, for example, five, divided components arranged in the vertical direction, each component being configured to provide zone control for each corresponding region. FIG. 8(a) shows an example in which temperature detecting sections 106 are provided, including, for example, five, thermocouples, corresponding to each heater 103, arranged between the inner tube 100 and the outer tube 101, thereby to perform the temperature control for the heaters 103 by using these temperature detecting sections 106. FIG. 8(b) shows an example in which temperature detecting sections 106 are provided to a supporting member 107 extending upward from the cover 105, the temperature detecting sections 106 comprising, for example, five, thermocouples, thereby to perform the temperature control for the heaters 103 by using these temperature detecting sections 106.

When the wafer boat 104 in which the wafers W are contained is carried in the reaction vessel 102 (upon the loading time), temperature change is likely to occur on an inner wall of the reaction vessel, or in this example, on an inner wall of the inner tube 100. Namely, the wafer boat 104, carried out from the interior of the reaction vessel 102 after a film forming process is ended, is cooled while processed wafers W are taken out from the boat and new wafers W are transferred into the boat. In addition, because relatively low temperature wafers W are loaded in the wafer boat 104, it is difficult to stabilize the temperature of the inner wall of the inner tube 100 upon the loading. For example, in the method shown in FIG. 8(a), since the temperature detecting sections 106 are located to be opposed to the heat processing atmosphere across the inner wall of the inner tube 100, the degree of lowering temperature on the temperature detecting sections 106 is smaller than the degree of lowering temperature on the inner wall of the inner tube 100. Thus, the power supply to each heater 103 tends to be insufficient, as such increasing the temperature drop of the inner wall.

In the method shown in FIG. 8(b), the temperature detecting sections 106 are not closely contacted with the inner wall of the inner tube 100, but are separated therefrom. In addition, each temperature detecting section 106 itself has a smaller heat capacity. Therefore, the value of temperature to be detected is lower than the actual temperature of the inner wall. While such a temperature drop can be addressed by controlling the detected lower temperature value to be returned to a desired value, the power supply to each heater 103 may tend to be unduly large, as such the temperature of the inner wall is likely to be excessively high. Alternatively, if employing such a configuration that the temperature detecting sections 106 are embedded in the inner wall of the inner tube 100, the temperature of the inner wall can be stabilized. However, this is not practical because the entire body of the inner tube 100 must be exchanged if any one of the temperature detecting sections 106 is disconnected.

If significant temperature change occurs in the inner wall of the inner tube 100, film peeling may tend to be caused by difference of coefficients of thermal expansion between the material of the reactions vessel, for example, quartz, and a thin film deposited on the inner wall, resulting in contamination due to particles or particle contamination. For example, a silicon nitride film is widely used in the so-called hard mask for use in etching, and possesses a higher dielectric constant, thus exhibiting electric properties equal to the silicon oxide film, even in the case of a physically greater film thickness. Therefore, the silicon nitride film is useful as a gate oxide film, a capping film for an interlayer isolation film, or the like. However, because of a significantly greater difference of coefficients of thermal expansion between the silicon nitride film and quartz, film peeling is likely to occur due to temperature change of the inner wall. Additionally, because of current tendency of designing a further miniaturized and thinner-filmed semiconductor device, the acceptable limit for particles has become quite critical. Therefore, phenomena that have not been considered significantly problematic tends to be conspicuous as factors of deteriorating the yield. Especially, the temperature change of the inner wall of the reaction vessel upon carrying in the wafer boat (or upon the loading time) is required to be suppressed to the utmost.

Patent Document 1 describes prediction of temperature of an object to be processed, based on detected values from a temperature sensor and a heating model, for preventing film peeling in the reaction vessel upon loading or unloading the wafer boat.

Patent Document 1: TOKUKAI No. 2005-159317, KOHO

SUMMARY OF THE INVENTION

The present invention was made under the circumstances described above. Therefore, it is an object of this invention to provide a heat processing apparatus and a heat processing method, for stabilizing the temperature of the inner wall of the reaction vessel, upon carrying in the substrate holding tool, during procedures of loading multiple sheets of substrates in the substrate holding tool, carrying the substrate holding tool into the reaction vessel and performing a heating process. It is also an object of this invention to provide a computer program and a storage medium for storing the computer program therein, for implementing the method.

The present invention is a heat processing apparatus, comprising: a reaction vessel including a furnace port; a heating means provided around the reaction vessel; a substrate holding tool adapted to hold a plurality of substrates in parallel to one another; a processing gas introduction means for introducing a processing gas into the reaction vessel and providing a heating process to the substrates; an external temperature detecting section provided outside the reaction vessel; a power source for supplying power to the heating means; and a control section for controlling the power source, wherein the control section includes: a prediction means for predicting an inner wall temperature of the reaction vessel, based on a command value of power to be supplied to the heating means; and a power control means for controlling the power to be supplied to the heating means, based on a temperature detection value detected by the external temperature detecting section and the inner wall temperature predicted by the prediction means.

The present invention is the heat processing apparatus described above, wherein the power control means includes a power command value operation section adapted to execute a first step of calculating the command value of the power to be supplied to the heating means, by using a prediction value $y_d$ of the inner wall temperature, as a main object to be controlled, during an initial time of loading to carry the substrate holding tool into the reaction vessel, and a second step of calculating the command value of the power to be supplied to the heating means, by using a detection value $y_m$ of the external temperature detecting section, as a main object to be controlled, during an end time of loading.

The present invention is the heat processing apparatus described above, wherein the first step includes calculating the command value of the power, base on a combined value including a greater ratio r and a setting temperature in the reaction vessel, the combined value being expressed by $y_d \times r + y_m \times (1-r)$, in which $y_d$ is the prediction value of the inner wall temperature obtained by the prediction means, $y_m$ is the detection value obtained by the external temperature detecting section, and r is in the range of $0 \leq r \leq 1$, and wherein the second step includes calculating the command value of the power, based on the combined value including a smaller ratio r and the setting temperature in the reaction vessel, the combined value being expressed by $y_d \cdot r + y_m \cdot (1-r)$, in which $y_d$ is the prediction value of the inner wall temperature obtained by the prediction means, $y_m$ is the detection value obtained by the external temperature detecting section, and r is in the range of $0 \leq r \leq 1$.

The present invention is the heat processing apparatus described above, wherein the ratio r in the first step is 100%.

The present invention is the heat processing apparatus described above, wherein the ratio r in the second step is 0%.

The present invention is the heat processing apparatus described above, wherein the power command value operation section executes a transition step between the first step and the second step wherein the command value of the power is calculated by setting the ratio r at a value between the value of the first step and the value of the second step, in order to suppress excessive temperature rising in the reaction vessel, during the end time of loading.

The present invention is the heat processing apparatus described above, wherein the ratio r in the transition step is gradually decreased over time.

The present invention is the heat processing apparatus described above, wherein an insulation material is interposed between a cover and the substrate holding tools, and an end portion temperature detecting section is provided in the vicinity of the insulation material, and wherein the control section includes means for determining a point of time to start the transition step, based on a difference of the temperature detection values of the end portion temperature detecting section and the external temperature detecting section at the time the substrate holding tool is carried out, as well as, based on an amount of change of time per unit temperature corresponding to the carrying-in speed of the substrate holding tool at the time.

The present invention is the heat processing apparatus described above, wherein an inner wall temperature detecting section is attached to an inner wall of the reaction vessel, the control section stores time series data, including the detection value of the inner wall temperature detecting section and the command value of the power to be supplied to the heating means, and the prediction means produces a prediction computing equation prescribing the relationship between the detection value of the inner wall temperature detecting section and the command value of the power, based on the time series data, and predicts the inner wall temperature of the reaction vessel by using the prediction computing equation.

The present invention is the heat processing apparatus described above, wherein the control section stores time series data, including the detection value of the external temperature detecting section and the command value of the power to be supplied to the heating means, and the prediction means produces a prediction computing equation prescribing the relationship between the detection value from the external temperature detection section and the command value of the power, based on the time series data, obtains a prediction value from the external temperature detecting section, based on the prediction computing equation and the command value of the power, and corrects the prediction value of the inner wall temperature of the reaction vessel, based on a difference between the prediction value and an actually obtained temperature detection value of the external temperature detecting section.

The present invention is a heat processing method for performing a heating process to substrates, by using a heat processing apparatus including: a reaction vessel including a furnace port; a heating means provided around the reaction vessel; a substrate holding tool adapted to hold a plurality of substrates in parallel to one another; a processing gas introduction means for introducing a processing gas into the reaction vessel and providing a heating process to the substrates; an external temperature detecting section provided outside the reaction vessel; a power source for supplying power to the heating means; and a control section for controlling the power source, wherein the control section includes a prediction means for predicting an inner wall temperature of the reaction vessel, based on a command value of power to be supplied to the heating means, and a power control means for controlling the power to be supplied to the heating means, based on a temperature detection value detected by the external temperature detecting section and the inner wall temperature predicted by the prediction means, the method comprising the steps of: detecting a temperature by using the external temperature detecting section provided outside the reaction vessel; predicting the inner wall temperature of the reaction vessel by using the prediction means of the control section, based on the command value of the power to be supplied to the heating means; and controlling the power to be supplied to the heating means, by using the power control means of the control section, based on the temperature detection value detected by the external temperature detecting section and the inner wall temperature predicted by the prediction section.

The present invention is the heat processing method described above, wherein the step of controlling the power to be supplied to the heating means includes a first step of calculating the command value of the power to be supplied to the heating means, by using a prediction value $y_d$ of the inner wall temperature, as a main object to be controlled during an initial time of loading to carry the substrate holding tool into the reaction vessel, and a second step of calculating the command value of the power to be supplied to the heating means, by using a detection value $y_m$ of the external temperature detecting section, as a main object to be controlled, during an end time of loading.

The present invention is the heat processing method described above, wherein the first step includes calculating the command value of the power, base on a combined value including a greater ratio r and a setting temperature in the reaction vessel, the combined value being expressed by $y_d \times r + y_m \times (1-r)$, in which $y_d$ is the prediction value of the inner wall temperature obtained by the prediction means, $y_m$ is the detection value obtained by the external temperature detecting section, and r is in the range of $0 \leq r \leq 1$, and wherein the second step includes calculating the command value of the power, based on the combined value including a smaller ratio r and the setting temperature in the reaction vessel, the combined value being expressed by $y_d \times r + y_m \times (1-r)$, in which $y_d$ is the prediction value of the inner wall temperature obtained by the prediction means, $y_m$ is the detection value obtained by the external temperature detecting section, and r is in the range of $0 \leq r \leq 1$.

The present invention is the heat processing method described above, wherein the ratio r in the first step is 100%.

The present invention is the heat processing method described above, wherein the ratio r in the second step is 0%.

The present invention is the heat processing method described above, further comprising a transition step between the first step and the second step wherein the command value of the power is calculated by setting the ratio r at a value between the value of the first step and the value of the second step, in order to suppress excessive temperature rising in the reaction vessel, during the end time of loading.

The present invention is the heat processing method described above, wherein the ratio r in the transition step is gradually decreased over time.

The present invention is the heat processing method described above, wherein an insulation material is interposed between a cover and the substrate holding tool, and an end portion temperature detecting section is provided in the vicinity of the insulation material, and wherein the control section determines a point of time to start of gradually decreasing the ratio r, based on a difference of the temperature detection values of the end portion temperature detecting section and the external temperature detecting section at the time the substrate holding tool is carried out, as well as, based on an amount of change of time per unit temperature corresponding to the carrying-in speed of the substrate holding tool at the time.

The present invention is the heat processing method described above, wherein an inner wall temperature detecting section is attached to an inner wall of the reaction vessel, wherein the control section stores time series data, including the detection value of the inner wall temperature detecting section and the command value of the power to be supplied to the heating means, and produces a prediction computing equation prescribing the relationship between the detection value of the inner wall temperature detecting section and the command value of the power, based on the time series data, by using the prediction means, and wherein the prediction step includes predicting the inner wall temperature of the reaction vessel, by using the prediction computing equation.

The present invention is the heat processing method described above, wherein the control section stores time series data, including the detection value of the external temperature detecting section and the command value of the power to be supplied to the heating means, and produces the prediction computing equation prescribing the relationship between the detection value of the external temperature detecting section and the command value of the power, based on the time series data, by using the prediction means, and wherein the prediction step includes obtaining a prediction value from the external temperature detecting section, based on the prediction computing equation and the command value of the power, and correcting the prediction value of the inner wall temperature of the reaction vessel, based on the difference between the prediction value and an actually obtained detection value of the external temperature detecting section.

The present invention is a computer program for operating a computer to execute a heat processing method for performing a heating process to substrates, by using a heat processing apparatus including: a reaction vessel including a furnace port; a heating means provided around the reaction vessel; a substrate holding tool adapted to hold a plurality of substrates in parallel to one another; a processing gas introduction means for introducing a processing gas into the reaction vessel and providing a heating process to the substrates; an external temperature detecting section provided outside the reaction vessel; a power source for supplying power to the heating means; and a control section for controlling the power source, wherein the control section includes a prediction means for predicting an inner wall temperature of the reaction vessel, based on a command value of power to be supplied to the heating means, and a power control means for controlling the power to be supplied to the heating means, based on a temperature detection value detected by the external temperature detecting section and the inner wall temperature predicted by the prediction means, the method comprising the steps of: detecting a temperature by using the external temperature detecting section provided outside the reaction vessel; predicting the inner wall temperature of the reaction vessel by using the prediction means of the control section based on the command value of the power to be supplied to the heating means; and controlling the power to be supplied to the heating means by using the power control means of the control section, based on the temperature detection value detected by the external temperature detecting section and the inner wall temperature predicted by the prediction section.

The present invention is a storage medium for storing a computer program for operating a computer to execute a heat processing method for performing a heating process to substrates, by using a heat processing apparatus including: a reaction vessel including a furnace port; a heating means provided around the reaction vessel; a substrate holding tool adapted to hold a plurality of substrates in parallel to one another; a processing gas introduction means for introducing a processing gas into the reaction vessel and providing a heating process to the substrates; an external temperature detecting section provided outside the reaction vessel; a power source for supplying power to the heating means; and a control section for controlling the power source, wherein the control section includes a prediction means for predicting an inner wall temperature of the reaction vessel, based on a command value of power to be supplied to the heating means, and a power control means for controlling the power to be supplied to the heating means, based on a temperature detection value detected by the external temperature detecting section and the inner wall temperature predicted by the prediction means, the method comprising the steps of: detecting a temperature by using the external temperature detecting section provided outside the reaction vessel; predicting the inner wall temperature of the reaction vessel by using the prediction means of the control section based on the command value of the power to be supplied to the heating means; and controlling the power to be supplied to the heating means by using the power control means of the control section, based on the temperature detection value detected by the external temperature detecting section and the inner wall temperature predicted by the prediction section.

According to the present invention, the external temperature detecting section is provided outside the reaction vessel, and the inner wall temperature of the reaction vessel is predicted, based on the command value of the power to be supplied to the heating means. The step of using the prediction value of the inner wall temperature, as a main object to be controlled, upon the loading, is included in the calculation of the command value of the power to be supplied to the heating means. Change of the inner wall temperature of the reaction vessel upon the loading can be suppressed, as such film peeling caused by, for example, heat shock, can be significantly suppressed.

Subsequently to the step described above, the calculation includes the step of using the combined value including the prediction value of the inner wall temperature and the detection value of the external detecting section, as an object to be controlled, and then using the detection value of the external temperature detecting section, as a main object to be controlled. Consequently, the gradual or mild change from the prediction value of the inner wall temperature into the detection value of the external temperature detecting section as the main object to be controlled can suppress the so-called overshoot that the temperature in the reaction vessel significantly exceeds a setting temperature due to application of excessive power to the heating means, after closing the reaction vessel by using the cover on the end point of the loading. As such, significantly rapid temperature stabilization can be achieved.

DETAILED DESCRIPTION OF THE INVENTION

Examples

Figure 1:
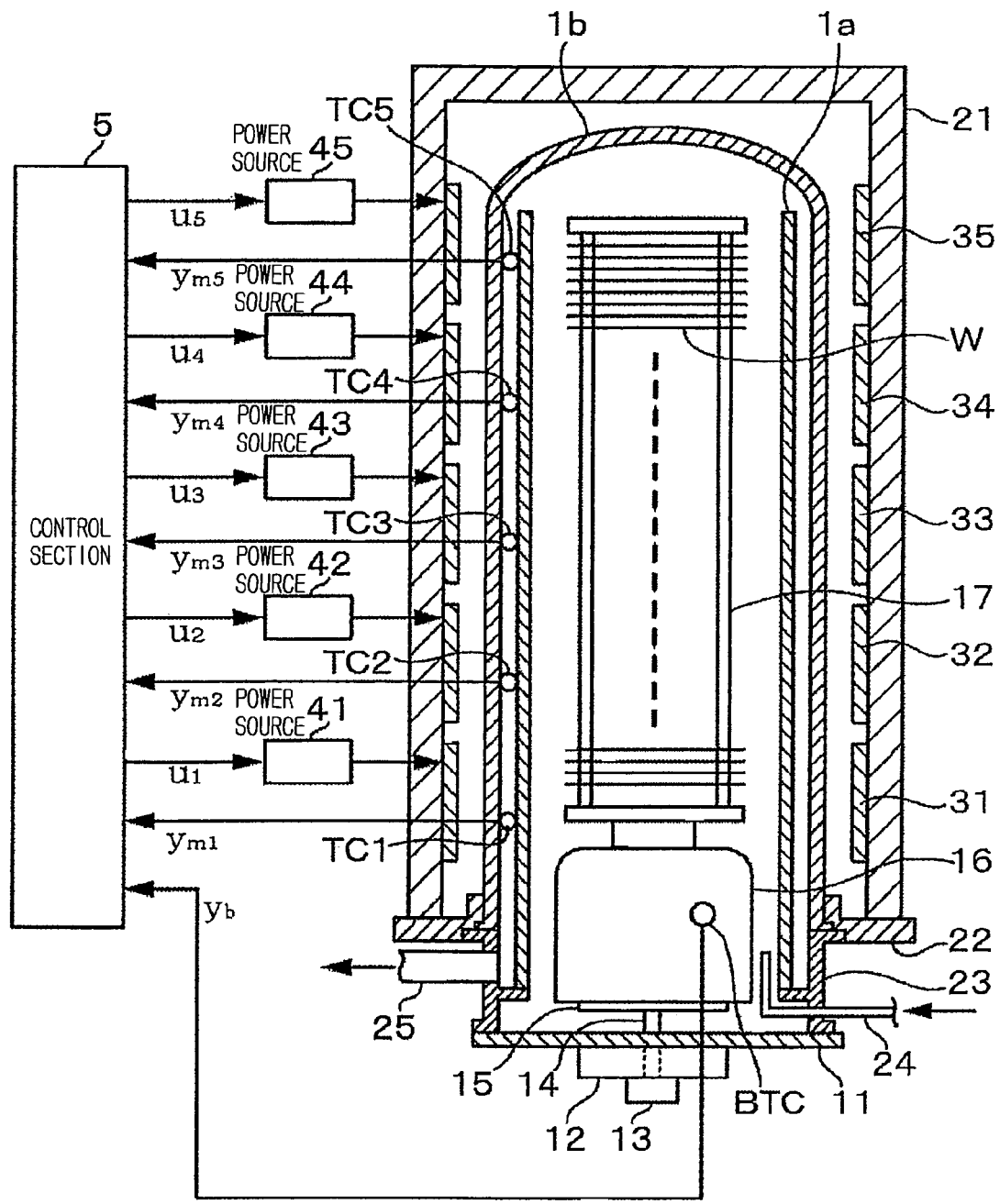
FIG. 1 is a side cross sectional view showing a vertical-type heat processing apparatus, which is one embodiment of the present invention.

FIG. 1 shows the entire construction of one embodiment, in which the present invention is applied to a vertical-type heat processing apparatus. First, the entire construction of the vertical-type heat processing apparatus will be described in brief. The vertical-type heat processing apparatus includes, for example, a quartz tube having a double tube structure, comprising an inner quartz tube 1a opening at both ends and an outer quartz tube 1b closed at its top end. In this example, since the inner wall 1a divides the heat processing atmosphere, a reaction vessel corresponds to the inner tube 1a. Around the outer tube 1b, a tubular thermal insulation layer 21 is provided, being fixed to a base body 22. On the inner wall of the thermal insulation layer 21, a plurality of heaters each comprising a resistance heating material are provided to be separately arranged, for example, in the vertical direction. In this example, the number of the divided stages of the heaters is, for example, five, and reference numerals 31 to 35 are respectively assigned to the divided heaters, in order, from the lowermost stage. Accordingly, the wafer heat processing atmosphere is divided into five zones in the vertical directions, in terms of heat control, and the heaters 31 to 35 have charges of heating these five zones, respectively.

The inner tube 1a and the outer tube 1b are supported on a tubular manifold 23 on the bottom side. With respect to the manifold 23, a gas supply pipe (a processing gas introduction means) 24 is provided such that a supplying port is opened in a bottom region inside the inner tube 1a, and an exhaust pipe 25 connected to a vacuum pump (not shown) is connected so as to carry out exhaustion from a space between the inner tube 1a and the outer tube 1b. It is noted that, in this embodiment, the manifold 23 also serves as a part of the reaction vessel.

Further, a cover 11 is provided to close the bottom end opening of the manifold 23, and the cover 11 is located on a boat elevator 12. On the cover 11, a rotation table 15 is provided to be opposed to the drive section 13 via a rotation shaft 14. On the rotation table 15, a wafer boat 17, as a substrate holding tool, is mounted via a thermal insulation unit 16, as a thermal insulation material composed of, for example, a heat insulation quartz tube. The wafer boat 17 is configured to place multiple sheets of wafers W therein in a shelf-like state.

Between the inner tube 1a and the outer tube 1b, external temperature sensors TC1 to TC5 are provided, each of which is composed of, for example, a thermo-couple, corresponding to external temperature detecting sections, and arranged in a position of height corresponding to each heater 31 to 35. These external temperature sensors TC1 to TC5 are provided on a rod (not shown) attached at its proximal end to, for example, a side wall of the manifold 23. In addition, power sources (power supplies) 41 to 45 are provided, corresponding to the respective heaters 31 to 35.

The vertical-type heat processing apparatus includes a control section 5, and the control section 5 is configured to take temperature detection values $y_{m1}$ to $y_{m5}$ of the external temperature sensors TC1 to TC5 and then output power command values $u_1$ to $u_5$ to the power sources 41 to 45, respectively. In the vicinity of the thermal insulation unit 16, a bottom portion temperature detecting section BTC comprising, for example, a thermo-couple is provided, which corresponds to an end portion temperature detecting section. A temperature detection value $y_b$ of the bottom portion temperature detecting section BTC is also inputted to the control section 5. The bottom portion temperature detecting section BTC is provided at, for example, a rod (not shown), attached to the cover 11.

Figure 2:
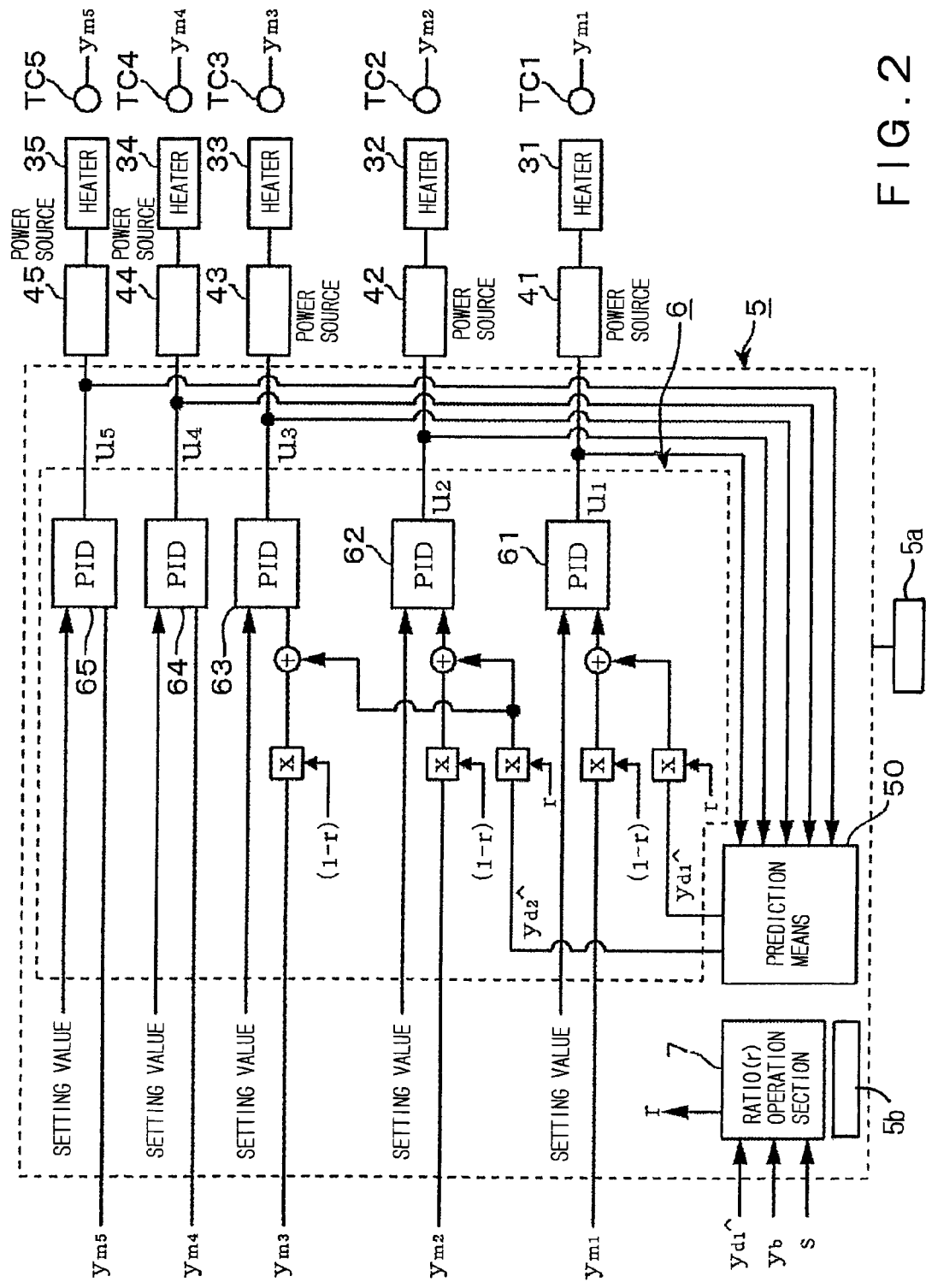
FIG. 2 is a block diagram showing a control section used in the embodiment of the present invention.

The control section 5, as shown in FIG. 2, includes a prediction means 50 for predicting the temperature of the inner wall of the inner tube 1a, and the prediction means 50 is configured to take the power command values $u_1$ to $u_5$ respectively corresponding to the power sources 41 to 45 and then output inner wall temperature detection values $yd_1$, $yd_2$ after performing an operation described below. The prediction of the temperature of the inner wall of the inner tube 1a means to predict the temperature at a site where a significantly large difference can be seen between the temperature detection values of the external temperature sensors TC1 to TC5 and the inner wall temperatures in the zones that the respective external temperature sensors TC1 to TC5 are provided during the initial loading time (or during the carrying-in time of the wafer boat 17 in which the wafers W are placed), in the inner wall of the inner tube 1a. In other words, a temperature detection value would be inputted from an imaginary temperature sensor as if the sensor were provided at the site.

Figure 3:
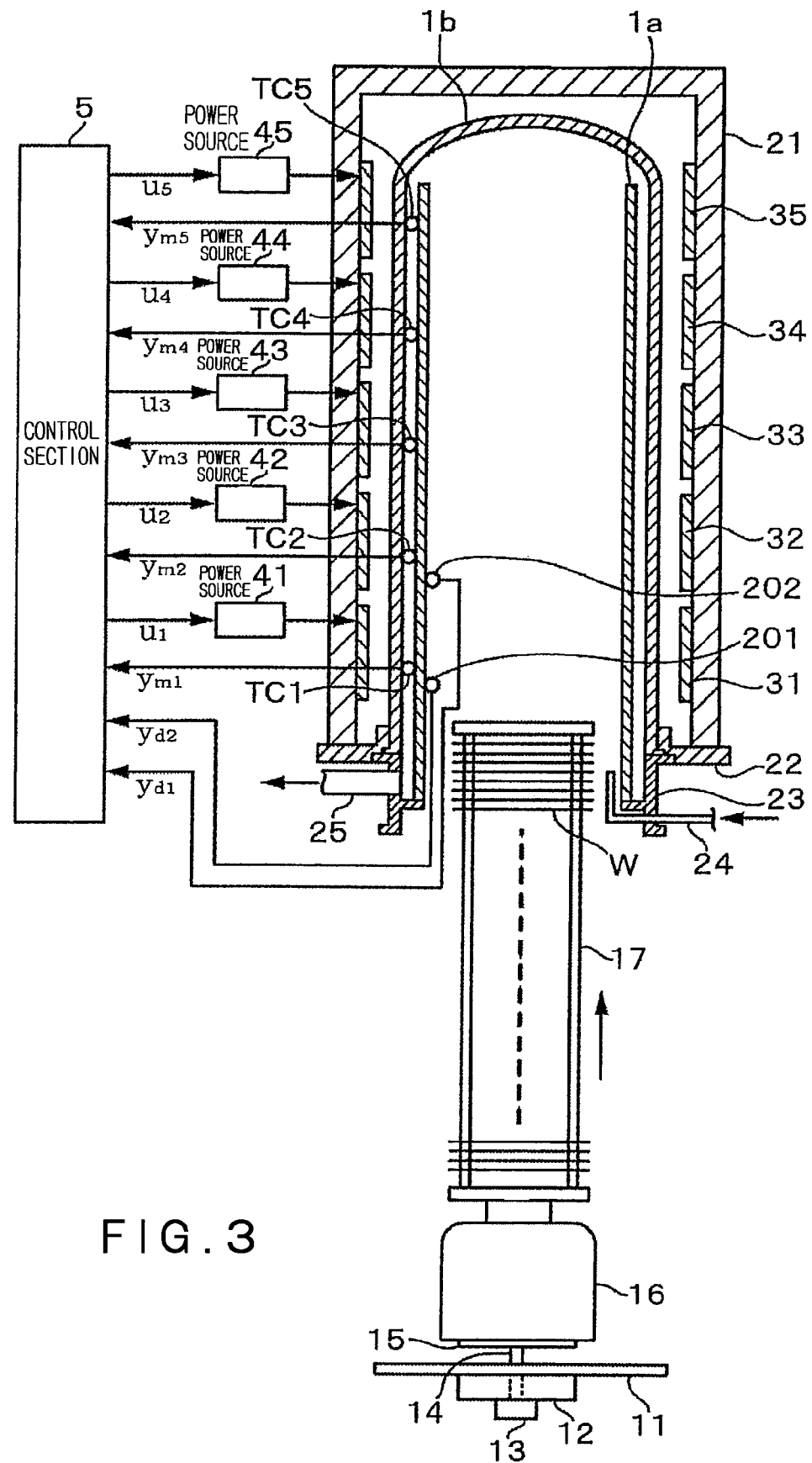
FIG. 3 is a side cross sectional view showing data acquisition by installing, in advance, temperature detecting sections on the inner wall of the reaction vessel in order to predict the temperature of the inner wall.

The prediction of the inner wall temperature will now be described more specifically. An inner wall temperature detecting section comprising, for example, a thermo-couple, is attached in advance to the inner wall of the inner tube 1a, as shown in FIG. 3, before subjecting the wafers W to a heating process. In this example, inner wall temperature sensors 201 and 202, which respectively serve as inner wall temperature detecting sections, are attached to two points, a position of a height nearer to a furnace port compared with the external temperature sensor TC1 on the first stage, and a position of a height between the first-stage external temperature sensor TC1 and the second-stage external temperature sensor TC2, respectively. Thus, deviations between temperature setting values of the zones corresponding to the respective heaters 31 to 35 and temperature detection values $y_{m1}$ to $y_{m5}$ of the external temperature sensors TC1 to TC5 are calculated by PID operation sections 61 to 65, respectively, and the power command values $u_1$ to $u_5$ for the respective heaters 31 to 35 are given to the power sources 41 to 45, and thereafter power corresponding to the power command values $u_1$ to $u_5$ are supplied, respectively.

Figure 4:
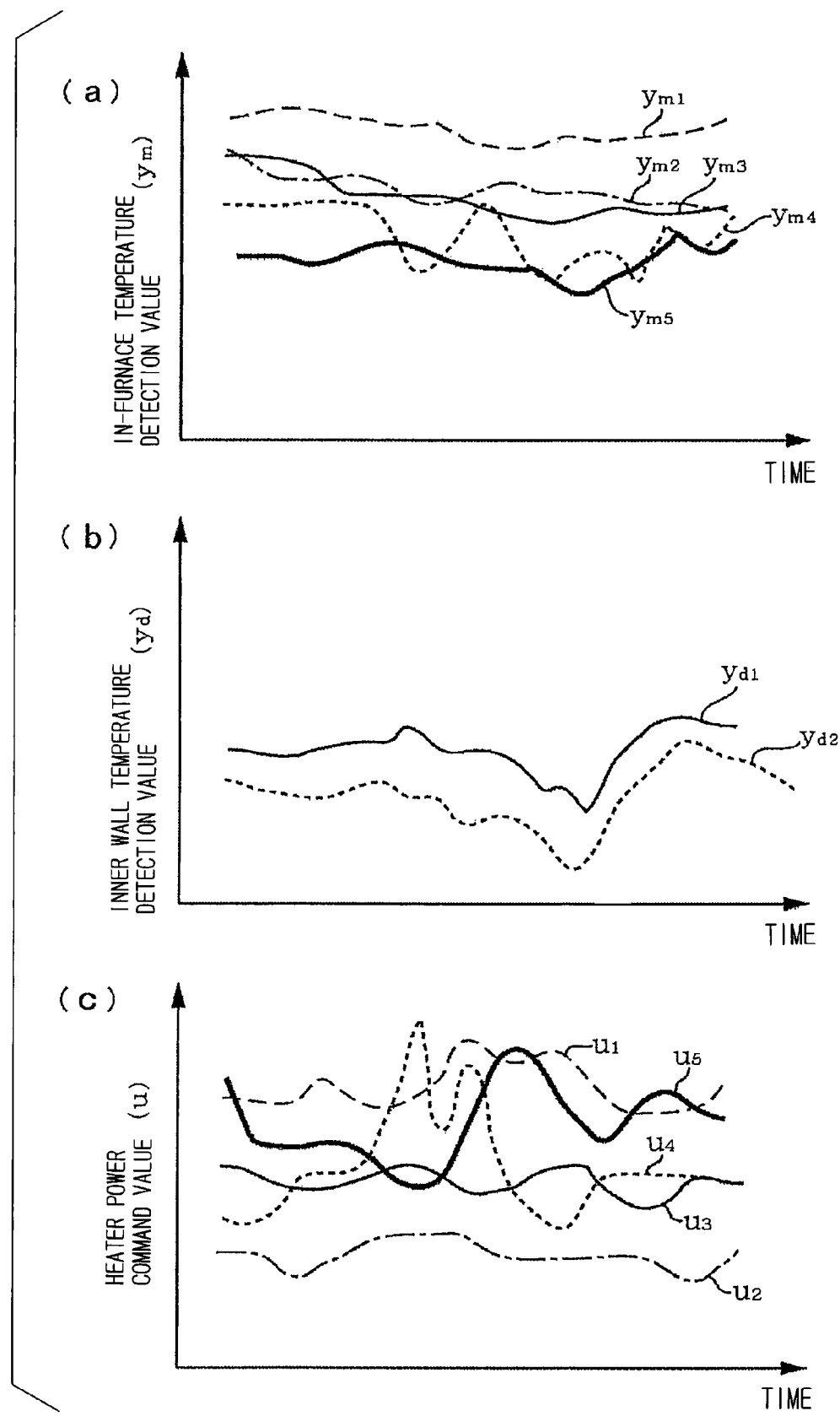
FIGS. 4(a) to 4(c) are illustrations, showing changes, over time, of an external temperature detection value, inner wall temperature and command value of power supplied to heaters, respectively.

The loading process is performed while such a temperature control is carried out and the wafers W are placed in the wafer boat 17. Until the furnace port of the reaction vessel is closed by the cover 11, the temperature detection values $y_{m1}$ to $y_{m5}$ of the external temperature sensors TC1 to TC5, the inner wall temperature detection values $y_{d1}$, $y_{d2}$ detected by the inner wall temperature sensors 201, 202, and the power command values $u_1$ to $u_5$, versus the time lapsed from the point of time the loading is started are stored in a memory (not shown) of the control section 5 or in a memory of another computer. FIG. 4 shows data stored in the memory, wherein FIG. 4(a) shows data concerning the temperature detection values $y_{m1}$ to $y_{m5}$ of the external temperature sensors TC1 to TC5, FIG. 4(b) shows data of the inner wall temperature detection values $y_{d1}$, $y_{d2}$, and FIG. 4(c) shows data of the power command values $u_1$ to $u_5$. Namely, from these data, the relationships between the three kinds of values, i.e., the temperature detection values $y_{m1}$ to $y_{m5}$, the inner wall temperature detection values $y_{d1}$, $y_{d2}$, and the power command values $u_1$ to $u_5$, can be obtained.

The power sources 41 to 45 are each composed of, for example, an AC power source, a switching section and a smoothing section, and the power command values $u_1$ to $u_5$ each corresponds to, for example, a signal prescribing a timing of conduction due to switching, i.e., an AC phase control signal. The information associated with a control section 5 is the same as the power to be supplied to the heaters 31 to 35. Thus, the data shown in FIG. 4 can also be translated into the relationships between the three kinds of values, i.e., the temperature detection values $y_{m1}$ to $y_{m5}$, the inner wall temperature detection values $y_{d1}$, $y_{d2}$, and the power supply to the heaters 31 to 35.

As the control method for obtaining the relationships between these three kinds of data, the deviation between the temperature setting value and the inner wall temperature detection value $y_{d1}$ may be calculated by using the PID operation section 61 corresponding to the first-stage heater 31, and the deviation between the temperature setting value and the inner wall temperature detection value $y_{d2}$ may be calculated by using the PID operation sections 62, 63 respectively corresponding to the second-stage and third-stage heaters 32, 33, so as to employ these deviations as an object to be controlled.

A general prediction equation for expressing relationships the temperature detection values and the power to be supplied to the heaters based on an autoregressive model with exogenous input (ARX model) can be obtained as the following equation (Equation 1).

$$y(k) = -P_1 y(k-1) - \ldots - P_n y(k-n) + Q_1 u(k-1) + \ldots + Q_n u(k-n) + e(k) \quad \text{(Equation 1)}$$

wherein k designates a timing for sampling, on which the computer captures data, and (k−1) means a timing which is one timing earlier than the k-th sampling. The term e(k) expresses disturbance. In this prediction equation, the variables y and u can be expressed as follows, by using vectors in necessary numbers corresponding to the number of inputs and outputs, because both of the heaters and temperature sensors are employed in multiple numbers.

$$y = [y_{m1}\ y_{m2}\ y_{m3}\ y_{m4}\ y_{m5}\ y_{d1}\ y_{d2}]^T$$

$$u = [u_1\ u_2\ u_3\ u_4\ u_5]^T$$

$$P_i = \begin{bmatrix} p_{i11} & p_{i12} & \cdots & p_{i1ny} \\ p_{i21} & p_{i22} & \cdots & \cdots \\ \cdots & \cdots & \cdots & \cdots \\ p_{iny1} & \cdots & \cdots & p_{inyny} \end{bmatrix}_{i=1:n} \quad \text{(Equation 2)}$$

$$Q_i = \begin{bmatrix} q_{i11} & q_{i12} & \cdots & q_{i1nu} \\ q_{i21} & q_{i22} & \cdots & \cdots \\ \cdots & \cdots & \cdots & \cdots \\ q_{iny1} & \cdots & \cdots & q_{inynu} \end{bmatrix}_{i=1:n}$$

where ny=7, and nu=5.

When $\theta = [P_1 \ldots P_n\ Q_1 \ldots Q_n]$, $$\phi(k) = [-y(k-1) \ldots -y(k-n) u(k-1) \ldots u(k-n)]^T \quad \text{(Equation 3)}$$

Accordingly, $y(k)=\theta\phi(k)+e(k)$ (Equation 4)

Because the relationships of the three kinds of values, i.e., the temperature detection values $y_{m1}$ to $y_{m5}$, the inner wall temperature detection values $y_{d1}$, $y_{d2}$, and the power command values $u_1$ to $u_5$, can be obtained as shown in FIG. 4, when discrete data of the three kinds of measured values are used as inputs to a calculation software, Matlab, the values of $P_i$ and $Q_i$ can be obtained, thus determining θ, thereby defining the Equation 4. One example of the discrete data of the three kinds of values is shown in Table 1.

TABLE 1

| $Y_{m1}$ | ... | $Y_{m5}$ | $Y_{d1}$ | $Y_{d2}$ | $u_1$ | ... | $u_5$ |
|---|---|---|---|---|---|---|---|
| 405.1 | ... | 407.3 | 400.8 | 402.1 | 41.6 | ... | 27.8 |
| 404.5 | ... | 407.2 | 398.5 | 401.5 | 41.9 | ... | 28.0 |
| 403.8 | ... | 407.4 | 396.1 | 399.7 | 42.7 | ... | 27.8 |
| 403.1 | ... | 407.4 | 393.2 | 396.9 | 43.3 | ... | 27.8 |
| 402.7 | ... | 407.3 | 390.0 | 394.4 | 44.1 | ... | 27.6 |
| 402.5 | ... | 407.2 | 387.5 | 392.7 | 45.2 | ... | 27.5 |
| 402.7 | ... | 407.0 | 384.8 | 390.1 | 45.5 | ... | 27.6 |
| ... | ... | ... | ... | ... | ... | ... | ... |

From the parameter vectors θ identified by the ARX model, the following state space model is obtained.

$$x(k+1)=Ax(k)+Bu(k)$$ (Equation 5)

$$y(k)=Cx(k)$$ (Equation 6)

wherein k designates a timing for sampling of data in the computer, and k=1, 2, .... The term A expresses a system matrix (n×n), B is a control matrix (n×5), and C is an output matrix (7×n). The transformation from the ARX model to the state space matrix can be obtained by utilizing functions provided by "system Identification Toolbox" of the MAT-LAB. Based on the state space model obtained as described above, the respective prediction values of the inner wall temperature detection values $y_{d1}$, $y_{d2}$ and the temperature detection values $y_{m1}$ to $y_{m5}$ of the external temperature sensors TC1 to TC5 can be obtained from the heater outputs (power command values).

In the present invention, the prediction of the inner wall temperature will be sufficient by obtaining only the prediction values of the inner wall temperature detection values $y_{d1}$, $y_{d2}$. In this example, however, further improvement of the prediction accuracy of the inner wall temperature detection values $y_{d1}$, $y_{d2}$ is attempted as described below, also by using the temperature detection values $y_{m1}$ to $y_{m5}$ of the external temperature sensors TC1 to TC5.

In the description provided below, a symbol "^" will be attached as the prediction value of each temperature detection value. Accordingly, the prediction value of the temperature detection value $y_m$ is expressed by $y_m\hat{}$, and the prediction value of the temperature detection value $y_d$ is designated by $y_d\hat{}$.

Figure 5:
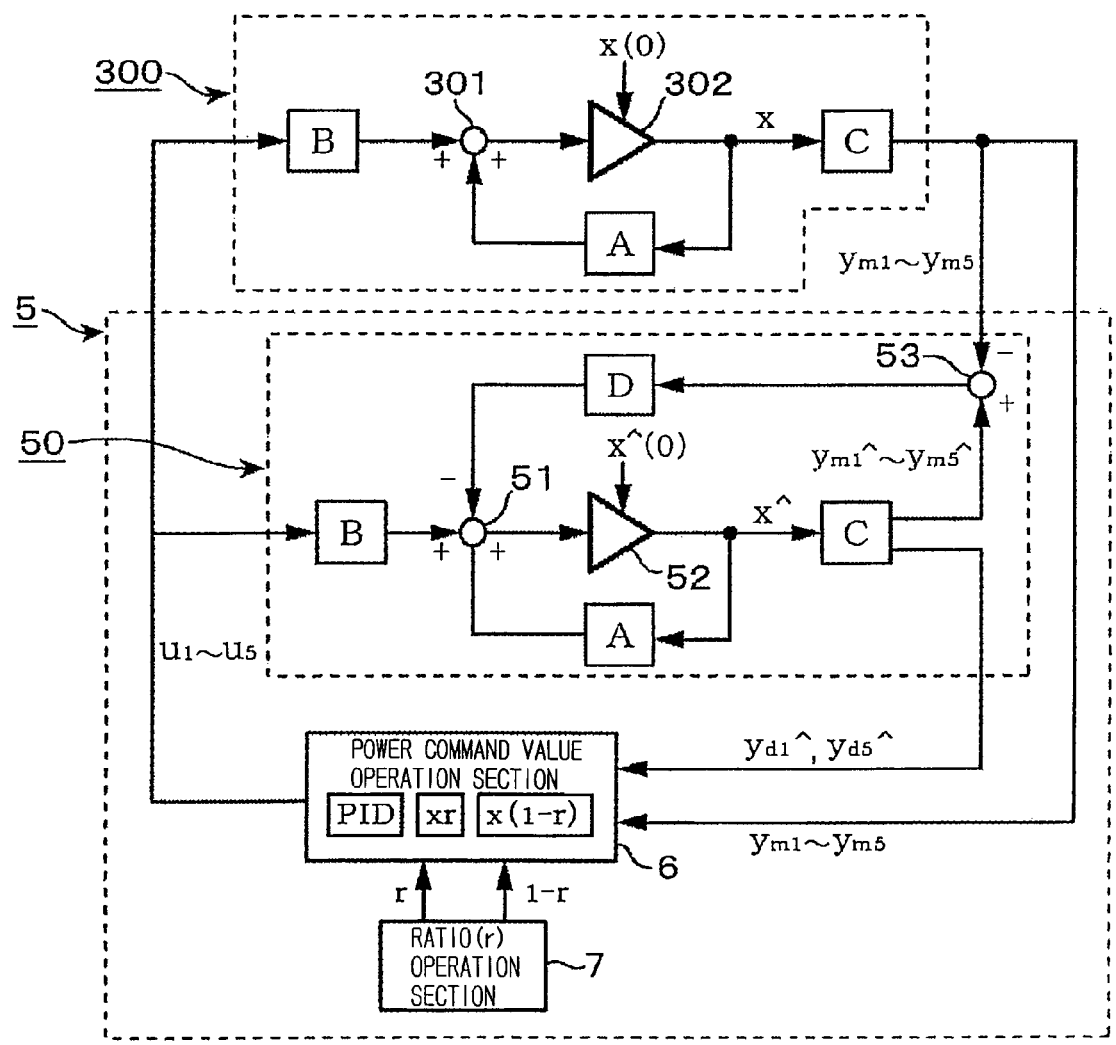
FIG. 5 is a block diagram, wherein an actual heating system in the reaction vessel and a means for predicting the inner wall temperature are each depicted by a block, and a control block is expressed by combining these blocks and a power command value operation section.

Thus, the prediction values $y_{d1}\hat{}$ and $y_{d2}\hat{}$ of the inner wall temperature can be obtained by operations or calculations in accordance with the Equations 5 and 6 using the prediction means 50. FIG. 5 is a block diagram showing a manner in which a main body of the vertical-type heat processing apparatus is expressed as a block, and the temperature detection values $y_{m1}$ to $y_{m5}$ are outputted from the external temperature sensors TC1 to TC5 of the apparatus main body designated by numeral 300, by supplying power to the respective heaters 31 to 35, or by providing the power command values to the power sources 41 to 45, respectively, and a manner in which prediction means 50 is expressed as a block, and the prediction values of the inner wall temperature are outputted, by inputting the power command values $u_1$ to $u_5$ to the prediction means 50. A power command value operation section 6 shown in FIG. 5 will be described below.

The description with respect to the prediction means 50 will be further continued. Blocks A, B, C correspond to coefficients A, B, C of the Equations 5, 6, and an operation of the term Ax(k) is performed in the block A, and operation of Bu(k) is performed in the block B, and an operation of Cx(k) is performed in the block C. In the Equations 5, 6, the term u(k) collectively expresses the power command values $u_1$ to $u_5$ on the timing k (k-th timing) of the sampling, and the term y(k) collectively expresses the prediction values $y_{m1}\hat{}$ to $y_{m5}\hat{}$ of the temperature detection values of the external temperature sensors TC1 to TC5 and the prediction values $y_{d1}\hat{}$ and $y_{d2}\hat{}$ of the inner wall temperature, on the timing k. In FIG. 5, reference numerals 301, 51 designate addition sections and 302, 52 express initial value input sections, respectively.

In this embodiment, the prediction means 50 is configured to obtain the differences, between the prediction values $y_{m1}\hat{}$ to $y_{m5}\hat{}$ of the temperature detection values of the external temperature sensors TC1 to TC5 and the actually measured temperature detection values $y_{m1}$ to $y_{m5}$ outputted from the apparatus main body 300, at the addition section 53, perform a predetermined operation, such as an operation based on the Kalman filter, with respect to the differences, at the block D, and subtract the obtained operation value from Ax(k)+Bu(k). Namely, in this example, the Equation 5 can be expressed as follows.

$$x(k+1)=Ax(k)+Bu(k)-D\Delta y(k)$$ (Equation 7)

The input and output value of each section in FIG. 5 is one expressed by a matrix. For instance, the output obtained from the addition section 53 is Δy, i.e., a value expressed by a matrix comprising the respective values of $y_{m1}\hat{}-y_{m1}$, $y_{m2}\hat{}-y_{m2}$, $y_{m3}\hat{}-y_{m3}$, $y_{m4}\hat{}-y_{m4}$, $y_{m5}\hat{}-y_{m5}$. The block D functions as, for example, a control matrix of (5×n).

In the present invention, the prediction values $y_{d1}\hat{}$ and $y_{d2}\hat{}$ may be obtained, based on the Equation 5 without considering Δy, i.e., based on the block not including the addition section 53 and the block D. However, if considering the difference between the actually measured temperature detection values ym1 to ym5 obtained from the external temperature sensors TC1 to TC5 and the prediction values $y_{m1}\hat{}$ to $y_{m5}\hat{}$, the operation or calculation for the prediction can be adjusted or matched to a phenomenon actually occurring in the apparatus. Thus, such a prediction is more preferred because the prediction accuracy of the inner wall temperature can be further enhanced.

In this example, in order to predict the inner wall temperature of the inner tube 1a, data are taken by attaching the inner wall temperature sensors 201 and 202, in advance, to the two points, and the prediction is controlled as if the detection of the inner wall temperature were carried out by using these inner wall temperature sensors 201 and 202. However, the site to be subjected to the prediction of the inner wall temperature is a point, which will exhibit a temperature difference between the inner wall temperature of the inner tube 1a and the temperature detection value of the external temperature sensor, upon the loading, such temperature difference being expected to cause inconvenience in control. It is noted that the inconvenience in control refers to a phenomenon in which the temperature difference is increased to an extent that the inner wall temperature of the inner tube 1a can not be stabilized so as to cause film peeling of a water.

Accordingly, in sites exhibiting little temperature difference, no significant inconvenience will occur even in the case of using the temperature detection value of the external temperature sensor (actually measured value) as the object to be controlled. Therefore, it is meaningless to perform the prediction of the inner wall temperature in these sites. Thus, in this example, the inner wall temperature sensors are provided, in advance, to the site concerned, i.e., only in the external temperature sensors TC1 to TC3 on the first to third stages, which are provided in regions each exhibiting a larger temperature difference (in this case, the inner wall temperature sensor 202 serves for the two external temperature sensors TC2 and TC3). As previously described, the inner wall temperature is predicted in accordance with a prediction model prepared based on the data obtained, and the temperature control is performed by using the predicted temperature, in place of or in combination with, the detection values of the external temperature sensors TC1 to TC3.

Because each inner wall temperature sensor is provided to the site in which the temperature difference described above is relatively large, the positions and the number of the sensors are not limited to the case described above and may be one or otherwise more than two.

Next, the power command operation section (power control means) 6 in the control section 5 will be described. In the power command operation section 6, the PID operation sections 61 to 65 are provided in five channels of a power control system corresponding to the heaters 31 to 35, respectively. To the operation sections 61 to 65, the temperature setting value and the temperature detection value of each temperature control zone in the inner tube 1a are usually inputted, and a power command value is outputted to each corresponding power source 41 to 45 in response to the deviation between the temperature setting value and the temperature detection value. In this embodiment, as the temperature detection values corresponding to the temperature control zones on the first to third stages (temperature control zones corresponding to the heaters 31 to 33), a combined value, $[y_{d1} \cdot r + y_{m1} \cdot (1-r)]$ is employed, wherein, for example, with respect to the channel on the first stage (the input side of the PID operation section 61 related to the temperature control of the first-stage heater 31), the ratio of the prediction value $y_{d1}\hat{}$ which will correspond to the temperature detection value to be obtained by the first-stage inner wall temperature sensor 201 is expressed by r ($0 \leq r \leq 1$), and the ratio of the temperature detection value of the first-stage external temperature sensor TC1 is expressed by (1−r).

For the channels on the second and third stages, a combined value, $[y_{d2} \cdot r + y_{m2} \cdot (1-r)]$ is employed, wherein the ratio of the prediction value $y_{d2}\hat{}$ which will correspond to the temperature detection value to be obtained by the second-stage inner wall temperature sensor 202 is expressed by r ($0 \leq r \leq 1$), and the ratio of the temperature detection value of the second-stage external temperature sensor TC2 (or the temperature detection value of the third-stage external temperature sensor TC3) is expressed by (1−r). It should be noted that the combined value for the channel on the third stage is $[y_{d2} \cdot r + y_{m3} \cdot (1-r)]$. On the other hand, for each channel on the fourth and fifth stages, similar to the conventional temperature control, each temperature detection value obtained by the external temperature sensors TC4, TC5 is regarded as the temperature of the inner tube 1a, and is used directly as the temperature detection value for the temperature control.

Figure 6:
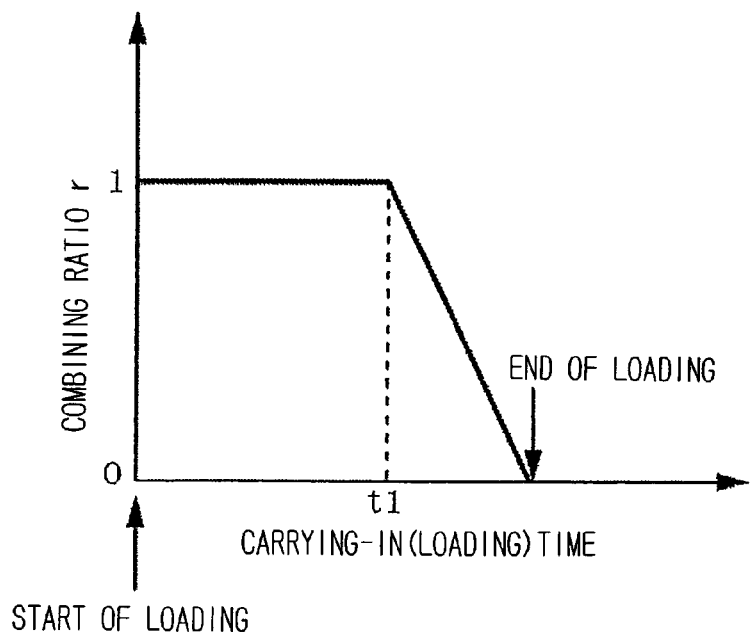
FIG. 6 is an illustration, showing one example of a pattern of change of a combining ratio.

The ratio r is calculated by a ratio operation section 7 in the control section 5. FIG. 6 shows changes of the ratio over time, in which the ratio r is expressed on the vertical axis and the time lapsed from the start of loading is expressed on the horizontal axis. As is seen from the profile depicted in FIG. 6, the ratio r is 1 (100%) until a certain period of time (loading initial time) lapses from the start of loading, and is gradually decreased at a point of time t1 en route, and becomes zero (0%) at a point of time (loading end point) the loading is ended (a point of time the furnace port is closed by the cover 11). Namely, the temperature control is carried out such that as the respective temperature detection values to be inputted to the PID operation sections 61 to 63, the prediction value $y_{d1}\hat{}$ ($y_{d2}\hat{}$) of the inner wall temperature is used until the point of time t1 from the start of loading, and the ratio of the actually measured values $y_{m1}$ to $y_{m3}$ of the external temperature sensors TC1 to TC3 is then increased in place of the prediction value $y_{d1}\hat{}$ ($y_{d2}\hat{}$) en route, and on the end point of the loading, the temperature control employs only the actually measured values $y_{m1}$ to $y_{m3}$.

The reason for gradually but not rapidly changing the temperature prediction values $y_{d1}\hat{}$ ($y_{d2}\hat{}$) of the inner wall, as the object to be controlled, into the actually measured values $y_{m1}$ to $y_{m3}$ of the external temperature sensors TC1 to TC3 is that the actually measured values $y_{m1}$ to $y_{m3}$ are not yet sufficiently elevated to match the inner wall temperature required just after completion of the loading, so that if rapidly changing the object to be controlled, the power supply to the heaters 31 to 33 upon the completion of the loading is unduely increased, as such causing the so-called overshoot of temperature.

Figure 7:
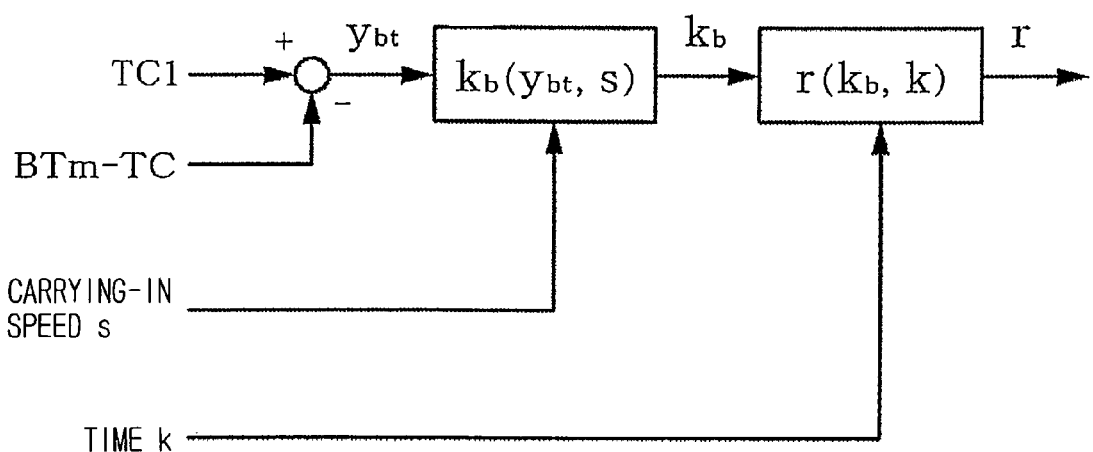
FIG. 7 is a block diagram showing a block of an operation section for calculating the ratio.
Figure 8:
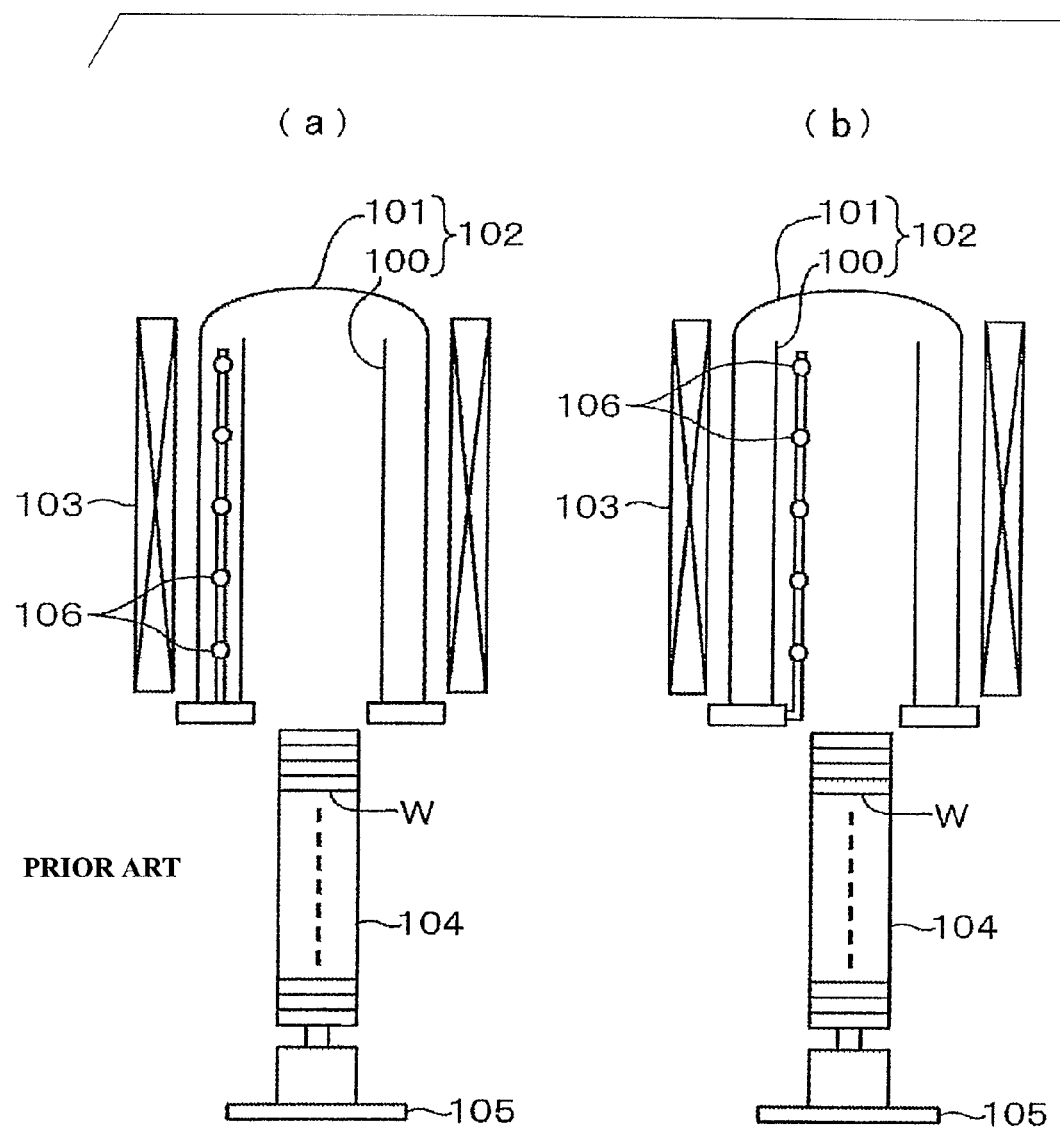
FIGS. 8(a) and 8(b) are side views, respectively showing methods for temperature detection, using conventional vertical-type processing apparatuses.

This embodiment addresses the problem above, by controlling the timing for reducing the ratio r from 1, due to prediction of a heat exchange completion time. The heat exchange completion time means a point of time the temperature detection values of the internal temperature sensors 201 and 202 change into a rising mode from a lowering mode. It should be noted that because the heat conduction rate is not changed in the temperature of the wafer transfer region below the furnace body as well as in the initial change of the running period (initial temperature change of the wafers and/or thermal insulation unit (heat insulation tube) 16), there is no need for providing a plurality of prediction models therein. However, since the total amount of heat energy is changed, the heat exchange completion time should be considered as a key parameter in the case of optimizing the ratio r in a time series. FIG. 7 shows one example of a method for calculating the ratio r, in the case of considering the temperature detection values, by providing the bottom portion temperature sensor BTC as the bottom portion temperature detecting section, constituting the end portion temperature detecting section, in the vicinity of the heat insulation unit 16 having a larger heat capacity, which is located between the cover 11 and the wafer boat 17 as shown in FIG. 1, in order to address the initial changes described above. The bottom portion temperature sensor BTC is composed of, for example, a thermo-couple, and attached to a distal end of the rod provided to the cover 11 to extend upwardly. While an actually measured temperature of the bottom portion temperature sensor BTC is added to the plant output as $y_b$, this value is not processed as an object to be controlled, and is merely employed as a trigger for the time series change of the ratio r.

A heat exchange completion time deriving function $k_b$ ($y_{bt}$, s) of FIG. 7 is defined, by measuring the heat exchange completion time, under various conditions wherein the temperature differences between the initial temperature $y_{bf}$ of the bottom portion temperature sensor BTC, upon starting the loading, i.e., when the wafer boat 17 is in the lowermost position, and the initial temperature $y_{m1}$ of the external temperature sensor TC1 on the first stage are different from one another. As used herein, the phrase "various conditions . . . different from one another" means a plurality of conditions wherein the initial temperatures of the thermal insulation unit (e.g., heat insulation tube) are different from one another, and the difference between the initial temperatures of the thermal insulation unit 16 can be translated into the case wherein the time lapsed after carrying out the wafer boat 17 from the reaction vessel varies.

The heat exchange completion time $k_b$ can be expressed as follows, provided that an amount of change of time per unit temperature is designated by $k_{bt}$.

$$kb = k_{bt} y_{bt}$$

wherein the input of $k_b(y_{bt})$ is the temperature difference $(y_{bt} = y_{m1} - y_b)$. In fact, the amount of change of time per unit temperature $k_{bt}$ should be provided for each carrying-in speed to be used. Therefore, the amount of change of time is measured under two conditions of the carrying-in speed, and a median value is assumed by linear interpolation. In order to consider the effect of the carrying-in speed of the wafer boat 17, the carrying-in speed (s) is also added to the input to obtain $K_{bt}(s)$, resulting in the following equation.

$$k_{bt}(s) = K_s(s - s_0) + K_{so}$$

In the above equation, $s_0$ is the carrying-in speed of the wafer boat 17 under a basic condition, and $k_{so}$ is the amount of change of time per unit temperature under the basic condition. As a result, the heat exchange completion time deriving function $k_b(y_{bt}, s)$ can be obtained as follows. As used herein, the basic conditions means either one of the two conditions of the carrying-in speed.

$$k_b(y_{bt}, s) = K_{bt}(s) y_{bt}$$

Considering the time $(k_b)$ obtained as described above as a combined starting point composed of the actually measured value $y_{m1}$ ($y_{m1}, y_{m3}$) of the external sensor TC1 to TC3 and the inner wall temperature prediction value $y_{d1}\hat{}$ ($y_{d2}\hat{}$), the ratio r is gradually decreased, based on $r(k_b, k)$, under the condition of time $(k > k_b)$.

In fact, the control section 5 is composed of, for example, a CPU, a ROM storing a program, and a computer including a memory storing temperature setting values, and the series of operation processes concerning the temperature control is performed in accordance with the program by using a software. FIG. 2 shows schematically the configuration of the control section 5. The program may be stored in, for example, a storage medium 5a, such as a flexible disk (FD), a memory card, a compact disk (CD), a magnet optical disk (MO), a hard disk or the like, and is installed in the computer serving as the control section 5.

Next, operation of the embodiment discussed above will be described. First, the relations ships between the three kinds of values, i.e., the temperature detection values $y_{m1}$ to $y_{m5}$, the inner wall temperature detection values $y_{d1}, y_{d2}$, and supply power (power command values) to the heater 31 to 35 are obtained by performing the loading process, with the inner temperature sensors 201 and 202 attached to the inner wall in the bottom region of the inner tube 1a, as detailed above, before subjecting a heating process to the wafers W. The discrete data of the three kinds of values are then inputted to the computer in order to obtain the respective coefficients in the Equation 1, the prediction equation of ARX, thereby to obtain the Equation 4. Subsequently, the Equations 5 and 6 as the state space models can be obtained based on the Equation 4. These operations are performed using a software of the computer, by inputting the discrete data thereto.

In this way, while the control section 5 is brought into a state wherein it can predict the inner wall temperature, the heating process is performed. Upon performing the heating process, the plurality of wafers W, which serve as substrates, are transferred to and held in a shelf-like state on the wafer boat 17 below the furnace body including the inner tube 1a and the manifold 23, and the boat elevator 12 is then lifted upward to carry the wafer boat 17 into the reaction vessel (or to provide the loading). At this time, the temperature of the interior of the inner tube 1a is set at, for example, 650° C. While the wafer boat 17, receiving the wafers W having been cooled in the air therein, is advanced into the inner tube 1a via the manifold 23 from the bottom end opening (furnace port) of the manifold 23, the inner wall temperature on the bottom side of the inner tube 1a is once significantly lowered. However, as the wafer boat 17 is elevated, both of the wafer boat 17 and the wafer W are heated. Thus, in the inner wall of the inner tube 1a, while the degree of temperature lowering is conspicuously great in the zones to be heated by the heaters 31 to 33 on the first to third stages, the degree of temperature lowering is significantly lessened in the further upper stages.

Among the external temperature sensors TC1 to TC5 provided between the inner tube 1a and outer tube 1b, the external temperature sensors TC1 to TC3, corresponding to the zones where the extent of lowering temperature is significantly large, indicate at a slightly higher temperature, compared with an actual temperature lowering pattern of the inner wall temperature without following the inner wall temperature. However, while the loading is carried out, or in this example, until the predetermined period of time described above lapses after the start of loading (initial time of loading), the object to be controlled should be the inner wall temperature prediction value $y_{d1}\hat{}$ ($y_{d2}\hat{}$), which is predicted by applying the Equation 7, i.e., the equation of the state space model, based on the power command value of each stage (first step). Namely, the temperature detection value to be inputted to the PID operation sections 61 to 63 corresponding to the heaters 31 to 33 on the first to third stages is set at the temperature prediction value $y_{d1}\hat{}$ ($y_{d2}\hat{}$), and the power command value is then outputted, by calculating the deviation between the temperature prediction value $y_{d1}\hat{}$ ($y_{d2}\hat{}$) and the temperature setting value, using each PID operation section. Accordingly, even though the inner wall temperature of the inner tube 1a is about to be significantly lowered due to advancement of cooled wafers W into the inner tube 1a, since power corresponding to such a change of the inner wall temperature is applied to the heaters 31 to 33, undesired fluctuation of the inner wall temperature can be suppressed due to the temperature control as described above. With respect to the power control of the heaters 34, 35 on the fourth and fifth stages, since the degree of lowering the inner wall temperature is substantially small, the function to suppress the fluctuation of the inner wall temperature can be sufficiently achieved, by performing it, based only on the temperature detection value of each external temperature sensor TC4, TC5.

After the predetermined period of time described above has lapsed after the start of loading, with respect to the temperature detection value to be inputted to the PID operation sections 61 to 63, the ratio of the temperature detection values (actually measured values) $y_{m1}, y_{m1}, y_{m3}$ of the external temperature sensors TC1 to TC3 is gradually increased (transition step), that is, the ratio of the inner wall temperature prediction value $y_d\hat{}$ ($y_{d2}\hat{}$) is gradually decreased, and after the end point of loading (end time of loading), only the actually measured values $y_{m1}, y_{m1}, y_{m3}$ are employed to perform the temperature control of the heaters 31 to 33 (second step). At this time, the point of time to start the transition step is obtained by a means 5b in the control section 5, based on the difference between the bottom portion temperature sensor BTC and the external temperature sensor TC1, as well as based on the amount of change of time per unit temperature corresponding to the carrying speed of the wafer boat 17 at that time.

After the internal temperature has been stabilized around a targeted process temperature, predetermined processing gases, for example, a dichlorosilane gas and an ammonia gas are supplied, as a film forming gas, into the inner tube 1*a* from the gas supply tube 24 comprising a two-piping system. At the same time, the interior of the inner tube 1*a* is kept at a predetermined degree of vacuum, by using a vacuum pump (not shown) via the exhaust pipe 25. Thereafter, a film forming process, which is a heating process, is provided to the wafers W while the wafer boat 17 is rotated by the drive section 13, as such the silicon nitride film is formed on each wafer W. Subsequently, the temperature setting value is decreased to lower the temperature of the inside of the reaction vessel, and the boat elevator 12 is lowered to carry out the wafer boat 17 from the reaction vessel.

According to the embodiment described above, since the heat stress, to the thin film deposited on the inner wall of the inner tube 1*a* due to the process that has been previously performed, can be controlled, when the wafers W are loaded, film peeling can be suppressed, as such reducing the particle contamination. As the object to be controlled upon the loading, the inner wall temperature prediction value $y_{d1}\hat{}$ ($y_{d2}\hat{}$) is not changed at once into the temperature detection values (actually measured values) $y_{m1}, y_{m1}, y_{m3}$ of the external temperature sensors TC1 to TC3, but changed into them gradually, with a combined state (transition step) of both of the values being provided to the change. Thus, after the furnace port is closed by the cover 11 after the loading ended, the phenomenon that the inner wall temperature once exceeds the setting temperature to a greater extent and then returns to the setting temperature (the so-called overshoot) can be suppressed, as such the heat processing atmosphere can be stabilized rapidly at a targeted temperature. Namely, the a bad effect that would be caused by using the inner wall temperature prediction value $y_{d1}\hat{}$ ($y_{d2}\hat{}$) upon the loading can be reduced possibly.

The heat processing apparatus of the present invention can also be applied to the case of forming a thin film, in addition to the silicon nitride film, on a substrate or substrates. While the heat processing apparatus described above includes a furnace body having a double tube structure composed of an inner tube and an outer tube, a single tube structure may be provided. In this case, the single tube corresponds to the reaction vessel, and the external temperature sensors may be provided outside the single tube.

Further, in the above case, the transition step wherein the object to be controlled is changed from the inner wall temperature prediction value into the temperature detection value (actually measured value) on the loading is not only limited to lessening the ratio r linearly and gradually, but may include a step of lessening it stepwise, including one or more steps. It is noted that the technical scope of the present invention includes employing the ratio r less than 100% in the first step wherein the inner wall prediction value is used as the main object to be controlled, and also includes employing the ratio r more than 0% in the first step as long as the temperature detection value of the external temperature sensor is used as the main object to be controlled.

The invention claimed is:

1. A heat processing apparatus, comprising:
   a reaction vessel including a furnace port;
   a heating means provided around the reaction vessel;
   a substrate holding tool adapted to hold a plurality of substrates in parallel to one another;
   a processing gas introduction means for introducing a processing gas into the reaction vessel and providing a heating process to the substrates;
   an external temperature detecting section provided outside the reaction vessel;
   a power source for supplying power to the heating means; and
   a control section for controlling the power source,
   wherein the control section includes:
   a prediction means for predicting an inner wall temperature of the reaction vessel, based on a command value of power to be supplied to the heating means;
   a power control means for controlling the power to be supplied to the heating means, based on a temperature detection value detected by the external temperature detecting section and the inner wall temperature predicted by the prediction means; and
   wherein the power control means includes a power command value operation section adapted to execute a first step of calculating the command value of the power to be supplied to the heating means, by using a prediction value $y_d$ of the inner wall temperature, as a main object to be controlled, during an initial time of loading to carry the substrate holding tool into the reaction vessel, and a second step of calculating the command value of the power to be supplied to the heating means, by using a detection value $y_m$ of the external temperature detecting section, as a main object to be controlled, during an end time of the loading.

2. The heat processing apparatus according to claim 1,
   wherein the first step includes calculating the command value of the power, based on a combined value including a greater ratio r and a setting temperature in the reaction vessel, the combined value being expressed by $y_d \times r + y_m \times (1-r)$, in which $y_d$ is the prediction value of the inner wall temperature obtained by the prediction means, $y_m$ is the detection value obtained by the external temperature detecting section, and r is in the range of $0 \leq r \leq 1$, and
   wherein the second step includes calculating the command value of the power, based on the combined value including a smaller ratio r and the setting temperature in the reaction vessel, the combined value being expressed by $y_d \times r + y_m \times (1-r)$, in which $y_d$ is the prediction value of the inner wall temperature obtained by the prediction means, $y_m$ is the detection value obtained by the external temperature detecting section, and r is in the range of $0 \leq r \leq 1$.

3. The heat processing apparatus according to claim 2, wherein the ratio r in the first step is 100%.

4. The heat processing apparatus according to claim 2, wherein the ratio r in the second step is 0%.

5. The heat processing apparatus according to claim 2,
   wherein the power command value operation section executes a transition step between the first step and the second step wherein the command value of the power is calculated by setting the ratio r at a value between the value of the first step and the value of the second step, in order to suppress excessive temperature rising in the reaction vessel, during the end time of loading.

6. The heat processing apparatus according to claim 5, wherein the ratio r in the transition step is gradually decreased over time.

7. The heat processing apparatus according to claim 5, wherein an insulation material is interposed between a cover and the substrate holding tool, and an end portion temperature detecting section is provided in the vicinity of the insulation material, and wherein the control section includes means for determining a point of time to start the transition step, based on a difference of the temperature detection values of the end portion temperature detecting section and the external temperature detecting section at the time the substrate holding tool is carried out, as well as, based on an amount of change of time per unit temperature corresponding to the carrying-in speed of the substrate holding tool at the time.

8. The heat processing apparatus according to claim 1, wherein an inner wall temperature detecting section is attached to an inner wall of the reaction vessel, the control section stores time series data, including the detection value of the inner wall temperature detecting section and the command value of the power to be supplied to the heating means, and the prediction means produces a prediction computing equation prescribing the relationship between the detection value of the inner wall temperature detecting section and the command value of the power, based on the time series data, and predicts the inner wall temperature of the reaction vessel by using the prediction computing equation.

9. The heat processing apparatus according to claim 1, wherein the control section stores time series data, including the detection value of the external temperature detecting section and the command value of the power to be supplied to the heating means, and the prediction means produces a prediction computing equation prescribing the relationship between the detection value of the external temperature detecting section and the command value of the power, based on the time series data, obtains a prediction value from the external temperature detecting section, based on the prediction computing equation and the command value of the power, and corrects the prediction value of the inner wall temperature of the reaction vessel, based on a difference between the prediction value and an actually obtained temperature detection value of the external temperature detecting section.

10. A heat processing method for performing a heating process to substrates, by using a heat processing apparatus including; a reaction vessel including a furnace port; a heating means provided around the reaction vessel; a substrate holding tool adapted to hold a plurality of substrates in parallel to one another; a processing gas introduction means for introducing a processing gas into the reaction vessel and providing a heating process to the substrates; an external temperature detecting section provided outside the reaction vessel; a power source for supplying power to the heating means; and a control section for controlling the power source, wherein the control section includes a prediction means for predicting an inner wall temperature of the reaction vessel, based on a command value of power to be supplied to the heating means, and a power control means for controlling the power to be supplied to the heating means, based on a temperature detection value detected by the external temperature detecting section and the inner wall temperature predicted by the prediction means, the method comprising the steps of:

detecting a temperature by using the external temperature detecting section provided outside the reaction vessel;

predicting the inner wall temperature of the reaction vessel by using the prediction means of the control section, based on the command value of the power to be supplied to the heating means;

controlling the power to be supplied to the heating means, by using the power control means of the control section, based on the temperature detection value detected by the external temperature detecting section and the inner wall temperature predicted by the prediction section; and wherein the step of controlling the power to be supplied to the heating means includes a first step of calculating the command value of the power to be supplied to the heating means, by using a prediction value $y_d$ of the inner wall temperature, as a main object to be controlled, during an initial time of loading to carry the substrate holding tool into the reaction vessel, and a second step of calculating the command value of the power to be supplied to the heating means, by using a detection value $y_m$ external temperature detecting section, as a main object to be controlled, during an end time of loading.

11. The heat processing method according to claim 10, wherein the first step includes calculating the command value of the power, based on a combined value including a greater ratio r and a setting temperature in the reaction vessel, the combined value being expressed by $y_d \times r + y_m \times (1-r)$, in which $y_d$ is the prediction value of the inner wall temperature obtained by the prediction means, $y_m$ is the detection value obtained by the external temperature detecting section, and r is in the range of $0 \leq r \leq 1$, and wherein the second step includes calculating the command value of the power, based on the combined value including a smaller ratio r and the setting temperature in the reaction vessel, the combined value being expressed by $y_d \times r + y_m \times (1-r)$, in which $y_d$ is the prediction value of the inner wall temperature obtained by the prediction means, $y_m$ is the detection value obtained by the external temperature detecting section, and r is in the range of $0 \leq r \leq 1$.

12. The heat processing method according to claim 11, wherein the ratio r in the first step is 100%.

13. The heat processing method according to claim 11, wherein the ratio r in the second step is 0%.

14. The heat processing method according to claim 11, further comprising a transition step between the first step and the second step wherein the command value of the power is calculated by setting the ratio r at a value between the value of the first step and the value of the second step, in order to suppress excessive temperature rising in the reaction vessel, during the end time of loading.

15. The heat processing method according to claim 14, wherein the ratio r in the transition step is gradually decreased over time.

16. The heat processing method according to claim 15, wherein an insulation material is interposed between a cover and the substrate holding tool, and an end portion temperature detecting section is provided in the vicinity of the insulation material, and wherein the control section determines a point of time to start of gradually decreasing the ratio r, based on a difference of the temperature detection values of the end portion temperature detecting section and the external temperature detecting section at the time the substrate holding tool is carried out, as well as, based on an amount of change of time per unit temperature corresponding to the carrying-in speed of the substrate holding tool at the time.

17. The heat processing method according to claim 11, wherein an inner wall temperature detecting section is attached to an inner wall of the reaction vessel, wherein the control section stores time series data, including the detection value of the inner wall temperature detecting section and the command value of the power to be supplied to the heating means, and produces a prediction computing equation prescribing the relationship between the detection value of the inner wall temperature detecting section and the command value of the power, based on the time series data, by using the prediction means, and wherein the prediction step includes predicting the inner wall temperature of the reaction vessel, by using the prediction computing equation.

18. The heat processing method according to claim 17, wherein the control section stores time series data, including the detection value of the external temperature detecting section and the command value of the power to be supplied to the heating means, and produces the prediction computing equation prescribing the relationship between the detection value of the external temperature detecting section and the command value of the power, based on the time series data, by using the prediction means, and wherein the prediction step includes obtaining a prediction value from the external temperature detecting section, based on the prediction computing equation and the command value of the power, and correcting the prediction value of the inner wall temperature of the reaction vessel, based on the difference between the prediction value and an actually obtained detection value of the external temperature detecting section.

19. A computer program for operating a computer to execute a heat processing method for performing a heating process to substrates, by using a heat processing apparatus including: a reaction vessel including a furnace port; a heating means provided around the reaction vessel; a substrate holding tool adapted to hold a plurality of substrates in parallel to one another; a processing gas introduction means for introducing a processing gas into the reaction vessel and providing a heating process to the substrates; an external temperature detecting section provided outside the reaction vessel; a power source for supplying power to the heating means; and a control section for controlling the power source, wherein the control section includes a prediction means for predicting an inner wall temperature of the reaction vessel, based on a command value of power to be supplied to the heating means, and a power control means for controlling the power to be supplied to the heating means, based on a temperature detection value detected by the external temperature detecting section and the inner wall temperature predicted by the prediction means, the method comprising the steps of:

detecting a temperature by using the external temperature detecting section provided outside the reaction vessel;

predicting the inner wall temperature of the reaction vessel by using the prediction means of the control section based on the command value of the power to be supplied to the heating means;

controlling the power to be supplied to the heating means by using the power control means of the control section, based on the temperature detection value detected by the external temperature detecting section and the inner wall temperature predicted by the prediction section; and wherein the step of controlling the power to be supplied to the heating means includes a first step of calculating the command value of the power to be supplied to the heating means, by using a prediction value $y_d$ of the inner wall temperature, as a main object to be controlled, during an initial time of loading to carry the substrate holding tool into the reaction vessel, and a second step of calculating the command value of the power to be supplied to the heating means, by using a detection value $y_m$ of the external temperature detecting section, as a main object to be controlled, during an end time of loading.

20. A storage medium for storing a computer program for operating a computer to execute a heat processing method for performing a heating process to substrates, by using a heat processing apparatus including: a reaction vessel including a furnace port; a heating means provided around the reaction vessel; a substrate holding tool adapted to hold a plurality of substrates in parallel to one another; a processing gas introduction means for introducing a processing gas into the reaction vessel and providing a heating process to the substrates; an external temperature detecting section provided outside the reaction vessel; a power source for supplying power to the heating means; and a control section for controlling the power source, wherein the control section includes a prediction means for predicting an inner wall temperature of the reaction vessel, based on a command value of power to be supplied to the heating means, and a power control means for controlling the power to be supplied to the heating means, based on a temperature detection value detected by the external temperature detecting section and the inner wall temperature predicted by the prediction means, the method comprising the steps of:

detecting a temperature by using the external temperature detecting section provided outside the reaction vessel;

predicting the inner wall temperature of the reaction vessel by using the prediction means of the control section based on the command value of the power to be supplied to the heating means;

controlling the power to be supplied to the heating means by using the power control means of the control section, based on the temperature detection value detected by the external temperature detecting section and the inner wall temperature predicted by the prediction section; and wherein the step of controlling the power to be supplied to the heating means includes a first step of calculating the command value of the power to be supplied to the heating means, by using a prediction value $y_d$ of the inner wall temperature, as a main object to be controlled, during an initial time of loading to carry the substrate holding tool into the reaction vessel, and a second step of calculating the command value of the power to be supplied to the heating means, by using a detection value $y_m$ of the external temperature detecting section, as a main object to be controlled, during an end time of loading.

21. The heat processing apparatus according to claim 3, wherein the ratio r in the second step is 0%.

* * * * *